(12) United States Patent
Marín Villamayor et al.

(10) Patent No.: US 9,547,966 B2
(45) Date of Patent: Jan. 17, 2017

(54) UNCOUPLING DEVICE AND METHOD

(75) Inventors: Ignacio Gabriel Marín Villamayor, Cariñena (ES); Lorena Gómez Latorre, Cariñena (ES)

(73) Assignee: Yudigar S.L.U., Zaragoza (ES)

( * ) Notice: Subject to any disclaimer, the term of this patent is extended or adjusted under 35 U.S.C. 154(b) by 255 days.

(21) Appl. No.: 14/367,459

(22) PCT Filed: Dec. 23, 2011

(86) PCT No.: PCT/ES2011/070900
§ 371 (c)(1),
(2), (4) Date: Oct. 2, 2014

(87) PCT Pub. No.: WO2013/093133
PCT Pub. Date: Jun. 27, 2013

(65) Prior Publication Data
US 2015/0029027 A1    Jan. 29, 2015

(51) Int. Cl.
*G08B 13/24*    (2006.01)
*G06Q 10/08*    (2012.01)
*G07G 1/00*    (2006.01)

(52) U.S. Cl.
CPC ......... *G08B 13/2465* (2013.01); *G06Q 10/087* (2013.01); *G07G 1/009* (2013.01); *G08B 13/242* (2013.01); *G08B 13/246* (2013.01); *G08B 13/2417* (2013.01); *G08B 13/2462* (2013.01); *G08B 13/2402* (2013.01)

(58) Field of Classification Search
CPC ............ G08B 13/242–13/246; G08B 13/2402–13/2465; G07G 1/009; G06Q 10/087
See application file for complete search history.

(56) References Cited

U.S. PATENT DOCUMENTS

| | | | | |
|---|---|---|---|---|
| 5,151,684 A * | 9/1992 | Johnsen | ........... | G06K 19/07703 340/5.92 |
| 5,745,036 A * | 4/1998 | Clare | ................ | G07G 1/0054 235/375 |
| 5,955,951 A * | 9/1999 | Wischerop | .......... | E05B 73/0017 340/10.42 |
| 6,226,619 B1 * | 5/2001 | Halperin | ................ | B65D 23/14 705/23 |

(Continued)

FOREIGN PATENT DOCUMENTS

EP    2284547 T3    11/2007
EP    1962475 B1    8/2008
(Continued)

*Primary Examiner* — Hai Phan
*Assistant Examiner* — Orlando Bousono
(74) *Attorney, Agent, or Firm* — Ladas & Parry LLP

(57) ABSTRACT

A removal device for a security tag attached to an article, including an identification of the security tag, offered for sale in a commercial establishment; where the removal device can be connected to a processor device configured, in turn, to supply an activation signal from the removal device, once the payment transaction has been completed, in order to remove the security tag in the event that there is a positive match between the security tag read by an identification reading device and a machine-readable identification tag read by a device for reading machine-readable identification tags prior to the completion of the sales transaction.

14 Claims, 1 Drawing Sheet

(56) References Cited

U.S. PATENT DOCUMENTS

| | | | |
|---|---|---|---|
| 6,429,776 B1* | 8/2002 | Alicot | G06K 1/18 235/462.01 |
| 6,598,790 B1* | 7/2003 | Horst | G07G 1/0036 235/375 |
| 7,083,085 B1* | 8/2006 | Daniels | G06Q 20/3278 235/380 |
| 7,173,528 B1* | 2/2007 | Stewart | G06K 19/07345 340/10.1 |
| 7,911,346 B1* | 3/2011 | Claudatos | G06Q 10/087 340/572.1 |
| 8,847,761 B1* | 9/2014 | Claudatos | G06Q 20/203 235/375 |
| 2002/0105424 A1* | 8/2002 | Alicot | G06K 1/18 340/572.1 |
| 2002/0116274 A1* | 8/2002 | Hind | G06K 19/07749 705/23 |
| 2003/0001007 A1* | 1/2003 | Lee | G07G 1/0054 235/383 |
| 2004/0070507 A1* | 4/2004 | Campero | G08B 13/246 340/572.9 |
| 2004/0111335 A1* | 6/2004 | Black | G06Q 10/087 705/28 |
| 2004/0143505 A1* | 7/2004 | Kovach | G06Q 10/087 705/23 |
| 2004/0220860 A1* | 11/2004 | Persky | A47F 9/047 705/23 |
| 2005/0035860 A1* | 2/2005 | Taylor | G06K 7/0008 340/572.1 |
| 2005/0040950 A1* | 2/2005 | Clucas | G08B 13/2448 340/572.1 |
| 2005/0061870 A1* | 3/2005 | Stockton | G06Q 20/387 235/380 |
| 2005/0061874 A1* | 3/2005 | Mathewson, II | G07G 1/0054 235/383 |
| 2005/0073416 A1* | 4/2005 | Mathewson, II | G06Q 20/202 340/572.1 |
| 2005/0073417 A1* | 4/2005 | Mathewson, II | G06Q 20/203 340/572.1 |
| 2005/0104733 A1* | 5/2005 | Campero | G08B 13/246 340/572.9 |
| 2005/0131763 A1* | 6/2005 | Junger | G06Q 10/08 705/23 |
| 2005/0134449 A1* | 6/2005 | Barile | G06K 7/0008 340/505 |
| 2005/0190060 A1* | 9/2005 | Clancy | G08B 13/246 340/572.9 |
| 2006/0028343 A1* | 2/2006 | Taylor | G06K 7/0008 340/572.1 |
| 2006/0033620 A1* | 2/2006 | Mathewson, II | G07G 1/0045 340/572.1 |
| 2006/0071070 A1* | 4/2006 | Maier | G06K 19/07716 235/385 |
| 2006/0072787 A1* | 4/2006 | Claudatos | G06Q 20/203 382/103 |
| 2006/0074759 A1* | 4/2006 | Claudatos | G06Q 10/087 705/22 |
| 2006/0125642 A1* | 6/2006 | Chandaria | B65D 5/4212 340/572.8 |
| 2006/0175402 A1* | 8/2006 | Maitin | G06Q 20/20 235/383 |
| 2006/0187042 A1* | 8/2006 | Romer | G06Q 20/208 340/572.1 |
| 2007/0109103 A1* | 5/2007 | Jedrey | G06Q 20/387 340/10.5 |
| 2007/0182557 A1* | 8/2007 | Stockton | G06Q 20/387 340/572.1 |
| 2007/0188333 A1* | 8/2007 | Clancy | G08B 13/246 340/572.9 |
| 2008/0001747 A1* | 1/2008 | Kangas | G06Q 10/087 340/572.1 |
| 2008/0001753 A1* | 1/2008 | Claudatos | G06Q 10/087 340/572.1 |
| 2008/0065496 A1* | 3/2008 | Fowler | G06Q 20/20 705/16 |
| 2008/0073430 A1* | 3/2008 | Sickenius | G06Q 20/20 235/383 |
| 2008/0088450 A1* | 4/2008 | Kwan | G07G 1/0036 340/572.1 |
| 2009/0066515 A1* | 3/2009 | Kangas | G06Q 10/087 340/572.1 |
| 2009/0096588 A1* | 4/2009 | Mynhardt | G07F 7/02 340/10.42 |
| 2009/0237219 A1* | 9/2009 | Berlin | G08B 13/246 340/10.6 |
| 2009/0255987 A1* | 10/2009 | Olivares Baena | G06F 21/34 235/380 |
| 2009/0322529 A1* | 12/2009 | Kangas | G08B 13/2417 340/572.1 |
| 2010/0060455 A1* | 3/2010 | Frabasile | G08B 13/2462 340/572.4 |
| 2010/0164691 A1* | 7/2010 | Berkhouwer | E05B 73/0017 340/10.5 |
| 2010/0198706 A1* | 8/2010 | Kangas | G06Q 10/087 705/28 |
| 2011/0029397 A1* | 2/2011 | Junger | G06Q 10/08 705/23 |

FOREIGN PATENT DOCUMENTS

| | | |
|---|---|---|
| EP | 2303084 T3 | 8/2008 |
| EP | 2311979 T3 | 2/2009 |
| EP | 2356667 T3 | 4/2011 |
| EP | 2367514 T3 | 11/2011 |

* cited by examiner

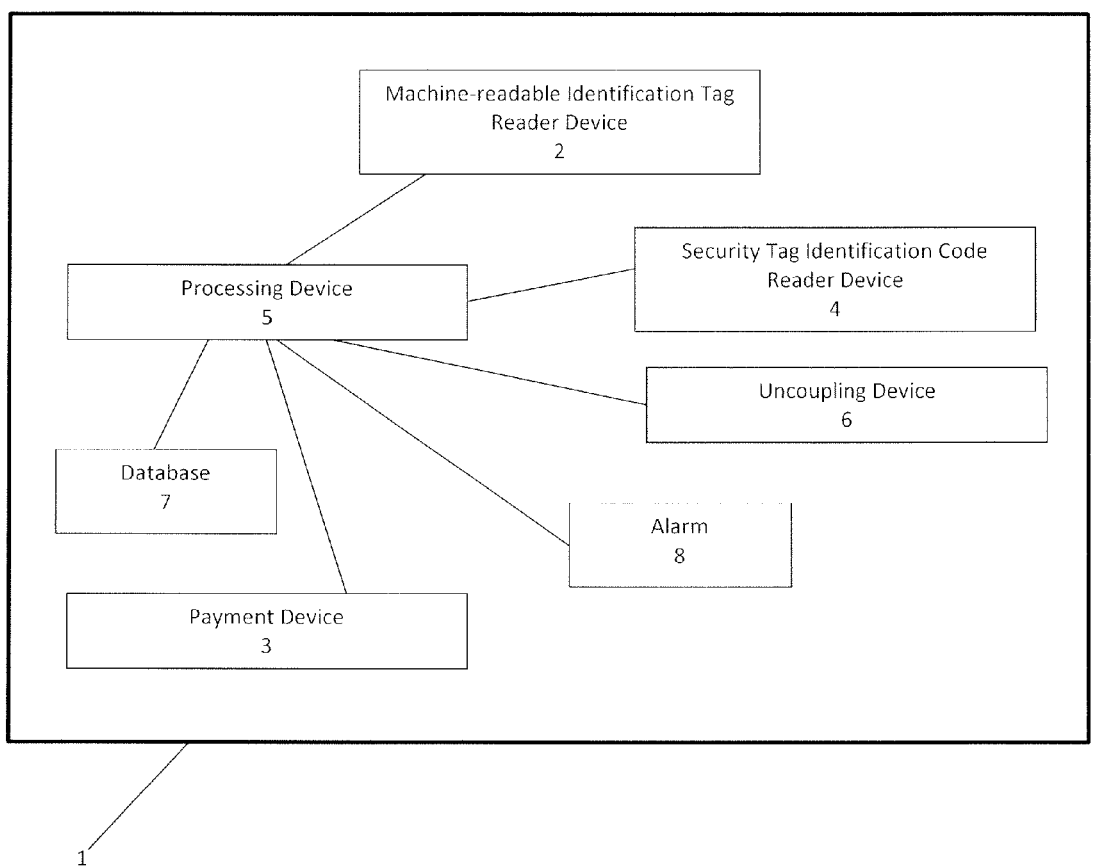

UNCOUPLING DEVICE AND METHOD

This application is a 371 of International Application PCT/ES2011/070900 filed 23 Dec. 2011 entitled "Uncoupling Device And Method", which was published on 27 Jun. 2013, with International Publication Number WO 2013/093133 A1, the content of which is incorporated herein by reference.

PURPOSE OF THE INVENTION

This invention refers to a device and a method for removing a security tag attached to an article or product after the completion of a sales transaction.

STATE OF THE ART

Within the state of the art, there exists a removal system for hard EAS security tags, consisting of identification of the RFID radio-frequency type, after the sale of the article, in order to prevent the security systems from being activated when the customer leaves the commercial establishment where the product has been purchased.

The system comprises an RFID reader located at a point of sale (POS), adapted to read the identification of the RFID tag in order to identify the article that the customer wants to purchase: a removal device connected to a database, the functioning of which is controlled by the database, in such a way that the removal device is only activated to remove the hard EAS tag if it is a saleable item.

However, the removal system does not include any type of verification or correlation between the product's barcode and the hard EAS security tag attached to the product itself.

SUMMARY

This invention seeks to resolve one or more of the disadvantages mentioned above by using a removal device for a security tag attached to an article offered for sale in a commercial establishment.

One advantage is providing a security tag removal device based on an association between an identification tag that can be read by machine and a security tag, with both tags attached to an article included in the inventory of articles offered for sale in the commercial establishment: where the security tag can be removed from the article after the sale is completed and the correlation between the security tag to be removed and the identification tag has been verified; if there is a match, an activation signal is generated from the removal device and, lastly, the correlating security tag exclusively attached to the article sold in the completed sales transaction is physically removed.

Another advantage is providing a sales procedure that includes the reading of the machine-readable identification tag associated with a saleable product, completion of the sale thereof, storage of the identification of the readable identification tag read, reading of the identification of a security tag attached to the sold product, verification of the correlation between the stored readable identification tag and the read security tag after the completion of the sales transaction.

Yet another advantage is providing a payment system for an article included in a commercial establishment's inventory and removing the security tag after the completion of a self-service sale by the customer his or herself.

This procedure for removing security tags attached to items allows for an operation with self-service points of sale, with excellent anti-theft security and a subsequent reduction in security costs.

A further advantage is supplying a point of sale (POS) that includes a device for reading machine-readable identification tags of the linear barcode type, a matrix of codes including several rows and columns of codes, identification by RFID, identification by NFC: a device for reading RFID identification codes included in a security tag of the EAS security tag type: an EAS tag-removal device and an identification reader of the RFID type. NFC short-range communication for said security tags, a processor that can be connected to the tag reader device and to the code reader, where the processor is adapted to verify the correlation between a security tag associated with a verification tag, both of which are attached to a single article, after the completion of a sales transaction; a security tag remover adapted for removing a security tag in the event that the result of the verification stage is positive; and a payment device.

Yet another advantage is that the procedure avoids the possibility of replacing a legitimate identification tag attached to a product with an illegitimate or erroneous one applicable to an article with a different price, avoiding the need for direct control or control using cameras by the establishment's personnel and, furthermore, that a security tag that has been removed matches an article that has been paid for previously.

One more advantage of the procedure is that it makes it possible to reuse the security tags after the sales transaction has been completed by attaching the same tag to a new product, with said security tag associated with the identification tag which is also attached to this product.

The term security tag is defined as an anti-theft device, generally for commercial establishments, comprised of a hard security tag including identification of the RFID or NFC type, attached to an article, included in an inventory, offered for sale in a commercial establishment. The article is protected with the application of said security tag, which acts as an alarm detected by security antenna located at the exit of the commercial establishment and EAS security elements to prevent theft.

The hard security tags are designed so that in order to remove them from an object, a removal device is required.

BRIEF DESCRIPTION OF THE DRAWINGS

FIG. 1 shows a point of sale of a commercial establishment for purchasing an article in accordance with the claimed invention.

DESCRIPTION OF AN EMBODIMENT

A point of sale (1) of a commercial establishment comprises a device for reading identification tags (2) that can be read by a machine of the scanner type, an RFID identification reader: a code-reading device (4) of the RFID radio-frequency identification type, short-range NFC communication, included in a security tag of the EAS security tag type: a processing device (5) that can be connected to the tag reading device (2) and the code reading device (4); a security tag removal device (6) adapted to remove security tags; and a device for manual and/or automatic payment (3) in cash and/or by credit and/or debit card and/or by other payment methods, of the portable, tablet, cell phone, etc. type.

The identification tags that are readable by machine (2) may be, for example, a linear barcode, a matrix of codes including numerous rows and columns of codes, an RFID radio-frequency identification tag, etc. Each article has at least one readable identification tag attached to it at its origin or in the establishment itself, and may be read by a reading device (2) adapted for executing the reading of the type of identification tag attached to it, for example a barcode can be read by a scanner.

Furthermore each article also has a security tag attached to it, comprising an RFID radio-frequency identification circuit, so that both tags match, where each pair of tags formed can be stored in a mass storage device of the database type.

Conducting an affirmative sales transaction at a point of sale (1) entails reading the identification tag for the article using the corresponding reading device (2) to identify the type of product and its price; then the purchase is made with payment on the payment device (3), completing the sales transaction.

The device for reading identification tags (2) can be connected to a processor device (5) that, in turn, can be connected to the database (7), so that when an identification tag is read by the identification tag reading device (2), an electric signal corresponding to the read identification tag is sent to the processor (5), and in response to the signal received, the processor (5) recovers the identification information of the security tag associated with the identification tag read from the database (7).

Once the sales transaction has been completed, the security tag is brought close to the RFID radio-frequency identification code reading device (4) in order to proceed to read the identification of the security tag of a sold article.

If the identification reader (4) executes a positive reading of the security tag, the reader (4) is configured to transmit an electric signal corresponding to the identification of the read security tag to the processor (5), and in response to the signal it received, the processor (5) verifies the correlation between the identification of the read security tag and the identification of the security tag it retrieves from the database (7), corresponding to one of the identification tags read previously, prior to the completion of the sales transaction.

In a scenario where there is a positive match between the identification retrieved and the identification read from the security tag, the processor supplies an activation signal to a release device (6) so that only the security tag attached to the article sold, and no others, is released.

Nevertheless, in a scenario where there is not a positive match between the identification retrieved and the identification read, the processor (5) will not send an activation signal to the removal device (6), and so the security tag attached to the article and read by the RFID identification reader (4) cannot be removed. The point of sale (1) includes a warning device (8) adapted to emit a warning signal to the establishment's personnel with lights, sounds, etc.

It should be noted that a security tag may be attached to an article before it arrives at the commercial establishment and/or once the article is located inside the commercial establishment itself. In this latter scenario, the security tags may be re-used and must be associated with the identification tag corresponding to the article to which the re-used security tag is attached each time and, furthermore, the new association or pair formed by the tags must be entered into the database (7).

In a scenario where the payment for articles sold in a commercial establishment is collected at a self-service point of sale (1), the use of the procedure for removing a security tag with an RFID code that matches an identification code associated with an identification tag attached to an article included in a previously-completed sales transaction prevents the possibility of customers being able to remove a security tag from an article for which the identification tag has not been read, and therefore which has not been paid for. Moreover, it also prevents identification tags from being switched between products with different prices.

Likewise, in a scenario where the machine-readable identification tags and the identification codes have the same type of identification by radio-frequency, the machine-readable identification tags and the identification code reading device may be the same.

Likewise, it also prevents errors by the establishment's personnel who perform payment tasks, such as charging for an item and removing the security tag attached to an item that has not been invoiced.

The procedure of removing a security tag can be performed by a computer, loadable into an internal memory of a computer with input and output units, as well as processor units.

For this purpose, the computer program includes codes that are configured for executing the steps of the aforementioned process when executed by the computer. Furthermore, the executable codes can be saved in a readable transfer medium in a computer.

The invention claimed is:

1. A point of sale of a commercial establishment for purchasing an article available for sale including a machine-readable identification tag and a security tag, and wherein a sale transaction for the article can be finalized; wherein the point of sale comprises:
   a machine-readable identification tag reader device configured for reading the machine-readable identification tag on the article before payment of the article;
   a payment device configured for paying for the article;
   a security tag identification code reader device configured for reading an identification code of the security tag on the article after payment of the article;
   a processing device configured to be connected both to the machine-readable identification tag reader device and to the security tag identification code reader device;
   an uncoupling device for uncoupling the security tags and configured to be connected to the processing device;
   the processing device being further configured:
   to receive a signal corresponding to the read machine-readable identification tag before payment of the article;
   to retrieve an identification of a security tag associated with the read machine-readable identification tag before payment of the article;
   to receive a signal corresponding to the identification code of the read security tag on the article alter payment of the article;
   to perform a verification of a correlation between the identification code of the read security tag after payment of the article and the identification of the security tag retrieved and associated with the read machine-readable identification tag before payment of the article; and
   to supply, in the event of a positive verification of the correlation between the identification code of the security tag read by the security tag identification code reader device after payment of the article and the identification of the security tag retrieved and associated with the read machine-readable identification tag before payment of the article by the processing device, an activation signal to the uncoupling device for uncoupling the security tag on the article in order to finalize the sale transaction.

2. The point of sale according to claim 1, wherein the machine-readable identification tag reader device is one of a scanner, a radio frequency identification (RFID) reader and a near field communication (NFC) reader.

3. The point of sale according to claim 2, wherein the machine-readable identification tag is one of a linear bar code, a code matrix including a plurality of rows and columns of codes, a radio frequency identification (RFID) tag, and a near field communication (NFC) tag.

4. The point of sale according to claim 1, wherein the security tag identification code reader device is configured for reading security tags of an electronic article surveillance type, including identification by radio frequency (RFID) and by near field communication (NFC).

5. The point of sale according to claim 1, wherein the processing device is connected to a database having a mass storage memory which stores a plurality of pairs formed by a machine-readable identification tags and security tags which exclusively match with the read machine-readable identification tag.

6. The point of sale according to claim 5, wherein the processing device retrieves from the mass storage memory the identification of the security tag associated with the read machine-readable identification tag read by the machine-readable identification tag reader device before payment of the article.

7. The point of sale according to claim 1, wherein the payment device comprises a manual and/or automatic payment system, in cash and/or with a debit and/or credit card and/or by other payment means of a portable device type such as a tablet or a mobile phone.

8. The point of sale according to claim 1, further configured to operate in a self-service system by a customer of the commercial establishment.

9. The point of sale according to claim 1, further including an alarm device for emitting a warning signal to the staff of the commercial establishment, indicating that there is no positive verification of the correlation between the identification code of the read security tag read by the security tag identification code reader device after payment of the article and the identification of the security tag retrieved and associated with the read machine-readable identification tag before payment of the article by the processing device:
the processing device being prevented from supplying the activation signal to the uncoupling device.

10. The point of sale according to claim 9, wherein the alarm device emits the warning signal using a light signal and/or an audible signal.

11. A method for uncoupling the security tag applied to the article for sale in the commercial establishment comprising the point of sale according to claim 1, wherein the method includes the steps of:
reading with the machine-readable identification tag reader device the machine-readable identification tag on the article before payment of the article;
transmitting the signal corresponding to the read machine-readable identification tag before payment of the article to the processing device connected to both the machine-readable identification tag reader device and to the security tag identification code reader device;
retrieving the identification of the security tag associated with the read machine-readable identification tag before payment of the article;
paying for the article with the payment device;
reading with the security tag identification code reader device the identification code of the security tag on the article after payment of the article;
transmitting the signal corresponding to the identification code of the read security tag after payment of the article to the processing device;
performing the verification of the correlation between the identification code of the read security tag after payment of the article and the identification of the security tag retrieved and associated with the read machine-readable identification tag before payment of the article;
supplying, in the event of the positive verification of the correlation between the identification code of the security tag read by the security tag identification code reader device after payment of the article and the identification of the security tag retrieved and associated with the read machine-readable identification tag before payment of the article by the processing device, the activation signal to the uncoupling device for
uncoupling the security tag on the article in order to finalize the sale transaction.

12. The method according to claim 11, wherein the method further comprises the step of exclusively matching the read machine-readable identification tag with the plurality of pairs formed by the machine-readable identification tags and the security tags which exclusively match with the read machine-readable identification tag, each of the plurality of formed pairs being stored in the mass storage memory of the database to which the processing device is connected.

13. The method according to claim 11, further comprising the step of emitting the warning signal to the staff of the commercial establishment in the event that there is no positive verification of the correlation between the identification code of the security tag read by the security tag identification code reader device after payment of the article and the identification of the security tag retrieved and associated with the read machine-readable identification tag before payment of the article by the processing device.

14. The method according to claim 13, further comprising the step in which the activation signal is prevented from being supplied to the uncoupling device in the event that there is no positive verification of the correlation between the identification code of the security tag read by the security tag identification code reader device after payment of the article and the identification of the security tag retrieved and associated with the read machine-readable identification tag before payment of the article by the processing device.

\* \* \* \* \*